United States Patent
Song et al.

(10) Patent No.: US 10,109,851 B2
(45) Date of Patent: Oct. 23, 2018

(54) COMPOSITE CATHODE ACTIVE MATERIAL, METHOD OF PREPARING THE SAME, AND CATHODE AND LITHIUM BATTERY INCLUDING THE COMPOSITE CATHODE ACTIVE MATERIAL

(71) Applicant: Samsung SDI Co., Ltd., Yongin-si, Gyeonggi-do (KR)

(72) Inventors: Yu-Mi Song, Yongin-si (KR); Ming-Zi Hong, Yongin-si (KR); Do-Hyung Park, Yongin-si (KR); Seon-Young Kwon, Yongin-si (KR); Joong-Ho Moon, Yongin-si (KR); Ju-Hyeong Han, Yongin-si (KR); Han-Eol Park, Yongin-si (KR); Min-Han Kim, Yongin-si (KR); Kyoung-Hyun Kim, Yongin-si (KR); Ki-Hyun Kim, Yongin-si (KR); Sang-Hoon Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1107 days.

(21) Appl. No.: 14/567,818

(22) Filed: Dec. 11, 2014

(65) Prior Publication Data
US 2015/0228970 A1    Aug. 13, 2015

(30) Foreign Application Priority Data
Feb. 10, 2014    (KR) .................. 10-2014-0014963

(51) Int. Cl.
| H01M 4/36 | (2006.01) |
| H01M 10/052 | (2010.01) |
| H01M 4/485 | (2010.01) |
| H01M 4/505 | (2010.01) |
| H01M 4/525 | (2010.01) |

(Continued)

(52) U.S. Cl.
CPC ......... H01M 4/366 (2013.01); H01M 4/0404 (2013.01); H01M 4/131 (2013.01);
(Continued)

(58) Field of Classification Search
CPC ......... H01M 10/052; H01M 2004/021; H01M 2300/0071; H01M 4/0404; H01M 4/131;
(Continued)

(56) References Cited

U.S. PATENT DOCUMENTS

| 8,906,553 B1* | 12/2014 | Hagh | .................. H01M 4/366 |
| | | | 252/521.2 |
| 2006/0257745 A1 | 11/2006 | Choi et al. | |
| 2011/0223456 A1* | 9/2011 | Sugaya | .................. H01M 4/13 |
| | | | 429/94 |

FOREIGN PATENT DOCUMENTS

| EP | 0 904 607 B1 | 10/2004 |
| KR | 10-2006-0091486 A | 8/2006 |

OTHER PUBLICATIONS

Duluard, Sandrine et al. "Lithium conducting solid electrolyte $Li_{1.3}Al_{0.3}Ti_{1.7}(PO_4)_3$ obtained via solution chemistry," Journal of the European Ceramic Society, 2013, vol. 33, pp. 1145-1153.

(Continued)

*Primary Examiner* — Lingwen R Zeng
(74) *Attorney, Agent, or Firm* — Lewis Roca Rothgerber Christie LLP

(57) ABSTRACT

A composite cathode active material includes a material capable of intercalating or deintercalating lithium; and a solid ion conductor. A cathode and a lithium battery each include the composite cathode active material. A method of preparing a composite cathode active material includes: mixing a core including a cathode active material and a solid ion conductor; and forming a coating layer including the solid ion conductor on the core utilizing a dry method.

15 Claims, 4 Drawing Sheets

(51) Int. Cl.
    *H01M 4/1391*     (2010.01)
    *H01M 4/04*     (2006.01)
    *H01M 4/131*     (2010.01)
    *H01M 4/02*     (2006.01)

(52) U.S. Cl.
    CPC ......... *H01M 4/1391* (2013.01); *H01M 4/485* (2013.01); *H01M 4/505* (2013.01); *H01M 4/525* (2013.01); *H01M 10/052* (2013.01); *H01M 2004/021* (2013.01); *H01M 2300/0071* (2013.01); *Y02T 10/7011* (2013.01)

(58) Field of Classification Search
    CPC .... H01M 4/1391; H01M 4/366; H01M 4/485; H01M 4/505; H01M 4/525; Y02T 10/7011
See application file for complete search history.

(56) References Cited

OTHER PUBLICATIONS

Aono, H. et al., The Electrical Properties of Ceramic Electrolytes for $LiM_xTi_{2-x}(PO_4)_3 + yLi_2O$, M = Ge, Sn, Hf, and Zr Systems, J. Electrochem. Soc., Jul. 1993, pp. 1827-1833, vol. 140, No. 7, The Electrochemical Society, Inc.

Bounar, N. et al., Structure, microstructure and ionic conductivity of the solid solution $LiTi_{2-x}Sn_x(PO_4)_3$, Physica B, Nov. 12, 2011, pp. 403-407, Elsevier B.V.

Wang, G.X. et al., $LiTi_2(PO_4)_3$ with NASICON-type structure as lithium-storage materials, Journal of Power Sources, May 9, 2003, pp. 231-236, vol. 124, Elsevier B.V.

\* cited by examiner

COMPOSITE CATHODE ACTIVE MATERIAL, METHOD OF PREPARING THE SAME, AND CATHODE AND LITHIUM BATTERY INCLUDING THE COMPOSITE CATHODE ACTIVE MATERIAL

CROSS-REFERENCE TO RELATED APPLICATION

This application claims priority to and the benefit of Korean Patent Application No. 10-2014-0014963, filed on Feb. 10, 2014, in the Korean Intellectual Property Office, the entire content of which is incorporated herein by reference.

BACKGROUND

1. Field

One or more aspects of embodiments of the present invention are directed toward a composite cathode active material, a method of preparing the same, and a cathode and a lithium battery each including the composite cathode active material.

2. Description of the Related Art

For use in smaller and higher-performing devices, in addition to miniaturization and lightweight properties, high energy-density is an important factor for lithium batteries. For example, lithium batteries having high capacity, high stability, and improved lifespan characteristics are desirable (or required).

To produce such lithium batteries, research into a cathode active material having high capacity, high stability and improved high-temperature lifespan characteristics is being performed.

$LiCoO_2$ has good electrochemical stability, but its discharging capacity is low. $LiNiO_2$ has high discharging capacity, but its thermal stability is low. $LiMnO_2$ has high discharging capacity, but its lifespan characteristics are poor.

Accordingly, by retaining the advantages of the above-identified cathode active materials while compensating for their disadvantages, a lithium battery having high capacity, improved thermal stability, and improved high-temperature lifespan characteristics may be obtained.

SUMMARY

One or more aspects of embodiments of the present invention are directed toward a novel composite cathode active material having high capacity, improved thermal stability, and improved high-temperature lifespan characteristics.

One or more embodiments of the present invention include a cathode including the composite cathode active material.

One or more embodiments of the present invention include a lithium battery including the cathode.

One or more embodiments of the present invention include a method of preparing the composite cathode active material.

An embodiment of the composite cathode active material includes a material capable of intercalating or deintercalating lithium; and a solid ion conductor.

According to one or more embodiments of the present invention, a cathode includes the composite cathode active material.

According to one or more embodiments of the present invention, a lithium battery includes the cathode.

According to one or more embodiments of the present invention, a method of preparing the composite cathode active material includes mixing a core including a cathode active material and solid ion conductor particles; and forming a coating layer including the solid ion conductor particles on the core by utilizing a dry method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
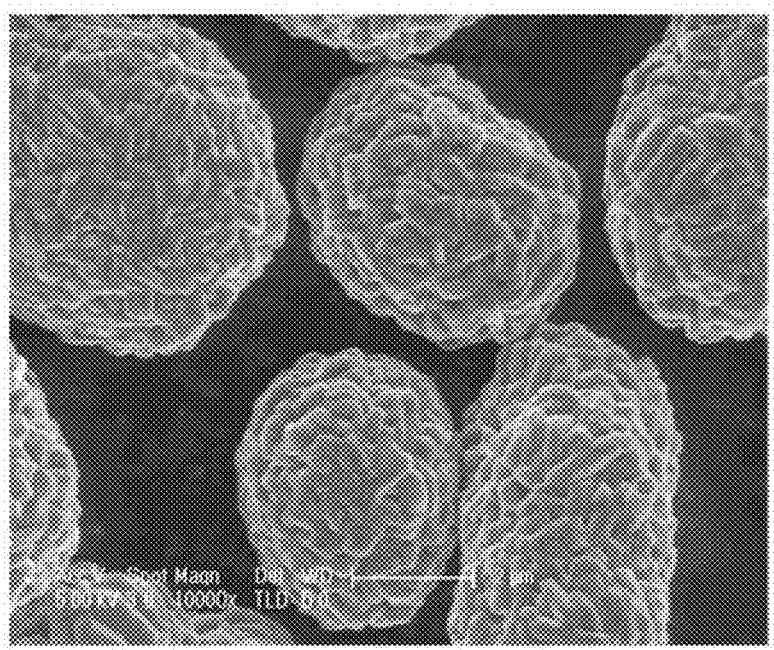
FIG. 1 is a scanning electron microscopic (SEM) image of a lithium transition metal oxide used (utilized) in Example 1.

Reference will now be made to embodiments of the present disclosure, examples of which are illustrated in the accompanying drawings, where like reference numerals refer to like elements throughout. In this regard, the present embodiments may have different forms and should not be construed as being limited to the descriptions set forth herein. Accordingly, the embodiments are described below, by referring to the figures, merely to explain aspects of the present description. As used herein, the term "and/or" includes any and all combinations of one or more of the associated listed items. Expressions such as "at least one of," when preceding a list of elements, modify the entire list of elements and do not modify the individual elements of the list. Also, in the context of the present application, when a first element is referred to as being "on" a second element, it can be directly on the second element or be indirectly on the second element with one or more intervening elements interposed therebetween.

Hereinafter, composite cathode active materials, methods of preparing the composite cathode active materials, and cathodes and lithium batteries each including the composite cathode active materials, according to embodiments of the present disclosure, will be described.

A composite cathode active material according to an embodiment of the present invention includes: a material that is capable of intercalating or deintercalating lithium; and a solid ion conductor. In an embodiment, the solid ion conductor may include two or more particles having different average particle diameters (e.g., the two or more particles have two or more average particle diameters (D50) that are different from each other). For example, the two or more particles may have a first average particle diameter (D50) and a second average particle diameter (D50), and the first average particle diameter and the second average particle diameter may be different from each other. Because the composite cathode active material includes the solid ion conductor, side-reaction with an electrolytic solution is suppressed (or reduced) and the thermal stability is improved, and thus, high-temperature stability and lifespan characteristics of a lithium battery may be improved. Because the composite cathode active material includes the solid ion conductor having two or more particles having different average particle diameters (D50), a lithium battery having improved properties may be provided.

The solid ion conductor included in the composite cathode active material may have a single-modal particle diameter distribution including either greater-diameter particles or smaller-diameter particles. For example, the solid ion conductor may have a single-modal particle diameter distribution having one peak in a particle size distribution diagram. In an embodiment, the solid ion conductor included in the composite cathode active material may have a bimodal particle diameter distribution including both greater-diameter particles and smaller-diameter particles. For example, the solid ion conductor may have a bimodal particle diameter distribution having two peaks in a particle size distribution diagram. For example, the solid ion conductor may have a trimodal particle diameter distribution having three peaks. In other embodiments, however, the particle diameter distribution diagram of the solid ion conductor may have four or more peaks. The bimodal particle diameter distribution may contribute to an improvement in properties of a lithium battery.

The composite cathode active material includes: a core including a material that is capable of intercalating or deintercalating lithium; and a coating layer on (or formed on) at least a portion of the core, where the coating layer may include a solid ion conductor.

Also, the coating layer may be on (or formed on) a plurality of cores (e.g., cores including a material capable of intercalating or deintercalating lithium) while connecting the cores. For example, the coating layer coats at least a portion of each core, and connects the cores. In other words, the coating layer fills a space between a plurality of cores. The coating layer may include greater-diameter particles and smaller-diameter particles.

For example, a coating layer on (or formed on) a single core may include smaller-diameter particles of the solid ion conductor. The coating layer may act (or function) as, for example, a protective layer for the core. For example, when the core is partially or completely coated with the smaller-diameter particles, a side-reaction between the core and an electrolytic solution may be suppressed (or reduced). Also, the coating layer may prevent (or reduce) leakage of a transition metal from the core including the material that is capable of intercalating or deintercalating lithium.

For example, the coating layer that is between (or formed between) a plurality of cores while connecting the cores may include greater-diameter particles of the solid ion conductor. Because the coating layer including greater-diameter particles is between (or formed between) cores, thermal stability of the material that is capable of intercalating or deintercalating lithium included in the cores may improve. For example, because the coating layer is between (or formed between) a plurality of cores, the coating layer blocks a contact between an electrolytic solution and each core in a space between cores to suppress (or reduce) a side-reaction, such as an oxidation reaction, of the cores with an electrolytic solution, thereby improving the thermal stability of the composite cathode active material.

Also, because the coating layer includes both (e.g., simultaneously includes) greater-diameter particles and smaller-diameter particles, a denser coating layer may be obtained.

In an embodiment, the greater-diameter particles (e.g., the greater-diameter particles of the solid ion conductor) may have a greater particle diameter (e.g., a greater average particle diameter) than the core. In the case that the greater-diameter particles have a greater particle diameter than the core, the composite cathode active material may include a plurality of cores each including a material that is capable of intercalating or deintercalating lithium; and a coating layer on (or formed on) at least a portion of each core, where the solid ion conductor is present in (e.g., inside) the coating layer and between the cores. For example, the smaller-diameter particles of the solid ion conductor are included in the coating layer on (or formed on) the core, and the greater-diameter particles are present between a plurality of cores, and in other words, the single greater-diameter particle is coated by a plurality of cores. Greater-diameter particles of the solid ion conductor may be present between a plurality of cores. Accordingly, a side-reaction, for example, an oxidation reaction, with an electrolytic solution may be suppressed (or reduced), and the thermal stability of the composite cathode active material may be improved.

For example, in the composite cathode active material, a coating layer including smaller-diameter solid ion conductor particles is on (or formed on) at least a portion of a core, and greater-diameter solid ion conductor particles may be present between a plurality of cores having the coating layer thereon.

In the composite cathode active material, the core and the coating layer may have a mechanochemical bond due to a mechanochemical reaction. In an embodiment, greater-diameter solid ion conductor particles present between cores may also have a mechanochemical bond due to a mechanochemical reaction.

An average particle diameter (e.g., D50) of the smaller-diameter particles (of the solid ion conductor) in the composite cathode active material may be 10 μm or lower. For example, an average particle diameter of the smaller-diameter particles may be in a range of about 10 nm to about 8 μm. For example, an average particle diameter of the smaller-diameter particles may be in a range of about 10 nm to about 6 μm. For example, an average particle diameter of the smaller-diameter particles may be in a range of about 10 nm to about 5 μm. For example, an average particle diameter of the smaller-diameter particles may be in a range of about 10 nm to about 4 μm. For example, an average particle diameter of the smaller-diameter particles may be in a range of about 10 nm to about 3 μm. For example, an average particle diameter of the smaller-diameter particles may be in a range of about 10 nm to about 2 μm. Within any of the foregoing average particle diameter ranges of the smaller-diameter particles (of the solid ion conductor), a lithium battery with improved properties may be obtained.

An average particle diameter (e.g., D50) of the greater-diameter particles (of the solid ion conductor) in the composite cathode active material may be greater than 10 μm and equal to or smaller than 100 μm. For example, an average particle diameter of the greater-diameter particles may be in a range of about 10 μm to about 90 μm. For example, an average particle diameter of the greater-diameter particles may be in a range of about 10 μm to about 80 μm. For example, an average particle diameter of the greater-diameter particles may be in a range of about 10 μm to about 70 μm. For example, an average particle diameter (e.g., D50) of the greater-diameter particles may be in a range of about 10 μm to about 60 μm. For example, an average particle diameter (e.g., D50) of the greater-diameter particles may be in a range of about 10 μm to about 50 μm. Within any of the foregoing average particle diameter ranges of the greater-diameter particles (of the solid ion conductor), a lithium battery with improved properties may be obtained.

An amount of the solid ion conductor in the composite cathode active material may be 10 wt % or lower based on a total weight of the composite cathode active material. For example, an amount of the solid ion conductor in the composite cathode active material may be 6 wt % or lower based on a total weight of the composite cathode active material. For example, an amount of the solid ion conductor in the composite cathode active material may be in a range of about 0.001 wt % to about 6 wt % based on a total weight of the composite cathode active material. For example, an amount of the solid ion conductor in the composite cathode active material may be in a range of about 0.001 wt % to about 5 wt % based on a total weight of the composite cathode active material. For example, an amount of the solid ion conductor in the composite cathode active material may be in a range of about 0.001 wt % to about 4 wt % based on a total weight of the composite cathode active material. For example, an amount of the solid ion conductor in the composite cathode active material may be in a range of about 0.001 wt % to about 3 wt % based on a total weight of the composite cathode active material. For example, an amount of the solid ion conductor in the composite cathode active material may be in a range of about 0.001 wt % to about 2 wt % based on a total weight of the composite cathode active material. For example, an amount of the solid ion conductor in the composite cathode active material may be in a range of about 0.001 wt % to about 1 wt % based on a total weight of the composite cathode active material. Within any of the foregoing amount ranges of the solid ion conductor, a lithium battery with improved properties may be obtained.

The solid ion conductor included in the composite cathode active material may include at least one selected from the group consisting of a NASICON-type (e.g., a NASICON analog or NASICON-based) lithium ion conductor, a thio-NASICON-type (e.g., a thio-NASICON analog or thio-NASICON-based) lithium ion conductor, a garnet-type (e.g., a garnet analog or garnet-based) lithium ion conductor), a perovskite-type (e.g., a perovskite analog or perovskite-based lithium ion conductor, and a lithium phosphorous oxynitride (UPON)-type (e.g., a UPON analog or UPON-based) lithium ion conductor).

As used herein, the term "NASICON" is an abbreviation of a Na super ion conductor, and non-limiting examples thereof include $Na_3Zr_2Si_2PO_{12}$, and $NaZr_2(PO_4)_3$. The NASICON-type lithium ion conductor refers to a lithium ion conductor that has the crystal structure of the NASICON compound or a crystal structure similar thereto and that provides high lithium ion conductivity due to the substitution of Na with lithium and the partial or complete substitution of other metals.

The thio-NASICON-type lithium ion conductor is formed by substituting a phosphoric acid (or phosphate group) of the NASICON-type lithium ion conductor with sulfur (S). An example of the thio-NASICON-type lithium ion conductor includes $Li_{4-x}M_{1-y}M'_yS_4$ (M=Si, Ge and M'=P, Al, Zn, Ga), but the present disclosure is not limited thereto, and any of various suitable thio-NASICON-type compounds that are available in the art may be used herein.

The garnet-type lithium ion conductor is a lithium ion conductor having a garnet-type crystal structure. An example thereof includes $Li_5La_3M_2O_{12}$ (M=Ta, Nb), but the present disclosure is not limited thereto and any of various suitable compounds that have a garnet crystal structure or a crystal structure similar to the garnet crystal structure and are available as a lithium ion conductor may be used (utilized) herein.

The perovskite-type lithium ion conductor is a lithium ion conductor having a perovskite crystal structure of $ABO_3$. An example thereof includes $Li_{0.34}La_{0.51}TiO_{2.94}$ (LLTO), but the present disclosure is not limited thereto and any of various suitable compounds that have a perovskite crystal structure or a crystal structure similar to the perovskite crystal structure and are available as a lithium ion conductor may be used (utilized) herein.

An example of the lithium phosphorous oxynitride (Li-PON)-type lithium ion conductor may include (or be) $Li_{3.3}PO_{3.9}N_{0.17}$ or $Li_{2.8}PO_{3.3}N_{0.46}$, but the present disclosure is not limited thereto, and the lithium phosphorous oxynitride may include (or be) any one of various suitable LiPON-type compounds that are available as a lithium ion conductor.

For example, the solid ion conductor of the composite cathode active material may include a NASICON-type lithium ion conductor represented by Formula 1:

$$Li_{1+z}Ma_xMb_{2-x}Mc_yP_{3-y}O_{12} \qquad \text{Formula 1}$$

In Formula 1, Ma and Mb may be each independently at least one selected from the group consisting of Zn, Cd, Ni, Mn, Co, Fe, Sc, Ti, V, Cr, Al, In, Ga, Y, Lu, Zr, Hf, Sn, Si, Ge, V, Nb, Ta, Sb, and As; Mc is Si or As; and $0 \leq x \leq 1$, and $0 \leq z \leq 1$.

For example, in Formula 1, Ma may be at least one selected from the group consisting of Zn, Cd, Ni, Mn, Co, Fe, Sc, Ti, V, Cr, Al, In, Ga, Y, Lu, Zr, Hf, Sn, Si, Ge, V, Nb, Ta, Sb, and As, Mb may include at least one selected from the group consisting of Zn, Cd, Ni, Mn, Co, Fe, Sc, Ti, V, Cr, Al, In, Ga, Y, Lu, Zr, Hf, Sn, Si, Ge, V, Nb, Ta, Sb, and As, and Ma may different from Mb.

For example, the solid ion conductor of the composite cathode active material may include a NASICON-type lithium ion conductor represented by Formula 2:

$$Li_{1+z}Ma_xMb_{2-x}(PO_4)_3 \qquad \text{Formula 2}$$

In Formula 2, Ma and Mb may be each independently at least one selected from the group consisting of Zn, Cd, Ni, Mn, Co, Fe, Sc, Ti, V, Cr, Al, In, Ga, Y, Lu, Zr, Hf, Sn, Si, Ge, V, Nb, Ta, Sb, La, and As; and $0 \leq x \leq 0.8$, and $0 \leq z \leq 0.8$.

For example, the solid ion conductor of the composite cathode active material may include at least one selected from the group consisting of $LiTi_{1.2}Sn_{0.8}(PO_4)_3$, $Li_{1.5}SnTi_{0.5}Al_{0.5}(PO_4)_3$, $Li_{1.3}Ti_{1.7}Al_{0.3}(PO_4)_3$, $LiAlO_2$, $Li_3PO_4\text{-}Li_4SiO_4$, $Li_{1.3}La_{0.3}Ti_{1.7}(PO_4)_3$, and $La_{0.5}Li_{0.5}TiO_3$.

A thickness of the coating layer in the composite cathode active material may be in a range of about 10 Å to about 10 μm. For example, a thickness of the coating layer may be in a range of about 1 nm to about 10 μm. For example, a thickness of the coating layer may be in a range of about 1 nm to about 5 μm. For example, a thickness of the coating layer may be in a range of about 1 nm to about 4 μm. For example, a thickness of the coating layer may be in a range of about 1 nm to about 3 μm. For example, a thickness of the coating layer may be in a range of about 1 nm to about 2 μm. For example, a thickness of the coating layer may be in a range of about 1 nm to about 1 μm. For example, a thickness of the coating layer may be in a range of about 1 nm to about 100 nm. For example, a thickness of the coating layer may be in a range of about 1 nm to about 30 nm.

In the composite cathode active material, the coating layer may completely coat the core, or may have (or be formed in) an island shape on a portion of the core (e.g., the coating layer may partially coat the core).

The core of the composite cathode active material may include (or be) a particle having an average particle (e.g., D50) of about 10 nm to about 50 μm. For example, an average particle diameter of the core may be in a range of about 10 nm to about 30 μm. For example, an average particle diameter of the core may be in a range of about 1 nm to about 30 μm.

In the composite cathode active material, the core that is capable of intercalating or deintercalating the lithium may include a cathode active material. The cathode active material may include (or be) a lithium transition metal oxide. The lithium transition metal oxide may include (or be) any of various suitable materials that are available for a cathode of a lithium battery in the art. For example, the lithium transition metal oxide may have a spinel structure or a layered structure, but the present disclosure is not limited thereto.

For example, the lithium transition metal oxide may include (or be) a single (or sole) composition. In other embodiments, the lithium transition metal oxide may include (or be) a composite of compounds each having two or more components. For example, the lithium transition metal oxide may include (or be) a composite of compounds each having two or more layered-structures. In some embodiments, the lithium transition metal oxide may include (or be) a composite including a compound having a layered structure and a compound having a spinel structure.

For example, the lithium transition metal oxide may include an overlithiated oxide (OLO) or a lithium transition metal oxide having an average working potential of 4.3 V or more. For example, an average working potential of the lithium transition metal oxide may be in a range of about 4.3 to about 5.0 V.

The above-referenced average working potential is obtained by dividing charging and discharging power amounts by charging and discharging electricity amounts in the case that a battery is charged and discharged with the upper and lower limits of charging and discharging potentials within a reference (i.e., recommended, predetermined or set) working voltage range of the battery.

For example, the core may include a compound represented by one of Formulae 3 to 7:

  Formula 3

  Formula 4

  Formula 5

  Formula 6

  Formula 7 where, in Formulae 3 to 7:
$0.90 \le x \le 1.1$, $0 \le y<1$, $0 \le z<1$, $1-y-z>0$, $0 \le \alpha \le 2$, and $0 \le r<1$,
Me is at least one metal selected from the group consisting of Ti, V, Cr, Mn, Fe, Co, Ni, Cu, Al, Mg, Zr, and B; M is at least one metal selected from the group consisting of Mg, Ca, Sr, Ba, Ti, Zr, Nb, Mo, W, Zn, Al, Si, Ni, Mn, Cr, Fe, Mg, Sr, V, and a rare earth element; and X is at least one metal selected from the group consisting of O, F, S, and P.

For example, the core may include a compound represented by one of Formulae 8 and 9:

  Formula 8

  Formula 9 where, in Formulae 8 and 9, $0<a<1$, $b+c+e=1$; $0<b<1$, $0<e<0.1$; and $0 \le d \le 0.1$, Me is at least one metal selected from the group consisting of Ti, V, Cr, Mn, Fe, Co, Ni, Cu, Al, Mg, Zr, and B, and M' is at least one metal selected from the group consisting of Mo, W, Ir, Ni, and Mg. For example, $0<a<0.33$. For example, a complies with the condition of $0<a<0.33$.

For example, the core may include the compound represented by one of Formulae 10 and 11:

  Formula 10

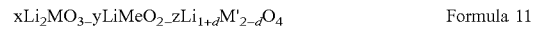  Formula 11 where, in Formulae 10 and 11, $0<p<1$, $x+y+z=1$; $0<x<1$, $0<y<1$, $0<z<1$; and $0 \le d \le 0.33$,
M is at least one metal selected from the group consisting of Mg, Ca, Sr, Ba, Ti, Zr, Nb, Mo, W, Zn, Al, Si, Ni, Mn, Cr, Fe, Mg, Sr, V, and a rare earth element; Me is at least one metal selected from the group consisting of Ti, V, Cr, Mn, Fe, Co, Ni, Cu, Al, Mg, Zr, and B; and M' is at least one metal selected from the group consisting of Ti, V, Cr, Mn, Fe, Co, Ni, Cu, Al, Mg, Zr, and B.

The compound of Formula 10 has a layered structure, and in Formula 11, $Li_2MO_3$–$LiMeO_2$ has a layered structure and $Li_{1+d}M'_{2-d}O_4$ has a spinel structure.

For example, the core may include the compound represented by Formula 12:

  Formula 12 where, in Formula 12, $0 \le y<1$, $0 \le z<1$, and $1-y-z>0$.

A cathode according to an embodiment of the present invention includes the composite cathode active material.

An example of a method of manufacturing a lithium battery is described below.

The composite cathode active material, a conductive material, a binder, and a solvent are mixed to prepare a cathode active material composition. The cathode active material composition is directly coated on an aluminum current collector and dried to form a cathode plate including a cathode active material layer. In other embodiments, the cathode active material composition is cast on a separate support, and then a film exfoliated from the support is laminated on the aluminum current collector to prepare a cathode plate including a cathode active material layer. The method of forming the cathode is not limited thereto, and any other suitable method may also be used (utilized) to form the cathode.

In some embodiments, the cathode may further include, in addition to the composite cathode active material including the solid ion conductor having a bimodal particle diameter distribution, an additional cathode active material that has a composition different from that of the composite cathode active material described above and that is available in the art.

As the additional cathode active material, at least one selected from the group consisting of a lithium cobalt oxide, a lithium nickel cobalt, manganese oxide, a lithium nickel cobalt aluminum oxide, a lithium iron phosphate oxide, and lithium manganese oxide may be further used (utilized). However, the additional cathode active material is not limited thereto. For example, any one of various suitable cathode active materials that are available in the art may be used (utilized).

An example of the additional cathode active material is a compound represented by any one of $Li_aA_{1-b}B_bD_2$ (where, $0.90 \le a \le 1.8$, and $0 \le b \le 0.5$); $Li_aE_{1-b}B_bO_{2-c}D_c$ (where, $0.90 \le a \le 1.8$, $0 \le b \le 0.5$, $0 \le c \le 0.05$); $LiE_{2-b}B_bO_{4-c}D_c$ (where, $0 \leq b \leq 0.5$, and $0 \leq c \leq 0.05$); $Li_aNi_{1-b-c}Co_bB_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where, $0.90 \leq a \leq 1.8$, $0 \leq b \leq 0.5$, $0 \leq c \leq 0.05$, and $0 < \alpha < 2$); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where, $0.90 \leq a \leq 1.8$, $0 \leq b \leq 0.9$, $0 \leq c \leq 0.5$, and $0 \leq d \leq 0.5$, $0.001 \leq e \leq 0.1$); $Li_aNiG_bO_2$ (where, $0.90 \leq a \leq 1.8$, $0.001 \leq b \leq 0.1$.); $Li_aCoG_bO_2$ (where, $0.90 \leq a \leq 1.8$, $0.001 \leq b \leq 0.1$); $Li_aMnG_bO_2$ (where, $0.90 \leq a \leq 1.8$, and $0.001 \leq b \leq 0.1$); $Li_aMn_2G_bO_4$ (where, $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

These additional cathode active material compounds represented by the formulae above may already have a coating layer on their surfaces.

The coating layer pre-formed on the additional cathode active material may include an oxide of a coating element, a hydroxide of the coating element, an oxyhydroxide of the coating element, an oxycarbonate of the coating element, or a hydroxycarbonate of the coating element. The compounds that form the coating layer may be amorphous or crystalline. As the coating element included in the coating layer, Mg, Al, Co, K, Na, Ca, Si, Ti, V, Sn, Ge, Ga, B, As, Zr, or a mixture thereof may be used (utilized). The coating layer may be formed by using (utilizing) any one of various suitable coating methods that are performed using (utilizing) the compounds and the elements and do not affect properties of the cathode active material (for example, spray coating, immersion, or the like). These coating methods should be apparent to one of ordinary skill in the art and thus, are not described in more detail herein.

For example, as the additional cathode active material, $LiNiO_2$, $LiCoO_2$, $LiMn_xO_{2x}(x=1, 2)$, $LiNi_{1-x}Mn_xO_2$ ($0 < x < 1$), $LiNi_{1-x-y}Co_xMn_yO_2(0 \leq x \leq 0.5, 0 \leq y \leq 0.5)$, $LiFeO_2$, $V_2O_5$, TiS, or MoS may be used (utilized).

Examples of the conductive material include carbon black, graphite particulate, natural graphite, artificial graphite, acetylene black, ketjen black, carbon fiber; carbon nanotube; metal powder or metal fiber or metal tube, such as copper, nickel, aluminum, or silver; and a conductive polymer, such as polyphenylene derivative, but the conductive material is not limited thereto and the conductive material may include (or be) any one of various suitable conductive materials that are available in the art.

As a binder, a vinylidene fluoride/hexafluoropropylene copolymer, polyvinylidenefluoride, polyacrylonitrile, polymethylmethacrylate, polytetrafluoroethylene (PTFE), a mixture thereof, or a styrene butadiene rubber-based polymer may be used (utilized), but the binder is not limited thereto.

As a solvent, N-methylpyrrolidone (NMP), acetone, water, or the like may be used (utilized). However, the solvent is not limited thereto, and the solvent may include (or be) any of various suitable materials that are available in the art.

Amounts of the cathode active material, the conductive agent, the binder, and the solvent may be at the same (or substantially the same) levels as used (utilized) in the art for lithium batteries. According to the purpose and structure of a lithium battery, one or more of the conductive agent, the binder, and the solvent may not be used (e.g., may be omitted).

A lithium battery according to an embodiment of the present invention includes the cathode. An example of a method of manufacturing a lithium battery is described below.

First, a cathode is manufactured by using (utilizing) the cathode manufacturing method described above.

Then, an anode active material composition including an anode active material, a conductive agent, a binder, and a solvent is prepared. The anode active material composition is directly coated and dried on a metal current collector to prepare an anode plate. According to another embodiment of the present invention, the anode active material composition is cast on a separator support and a film exfoliated from the support is laminated on the metal current collector to prepare an anode electrode plate.

The anode active material may include (or be) any one of various suitable materials that are capable of intercalating or deintercalating lithium and are available as an anode active material in the art. For example, the anode active material may include at least one selected from lithium metal, lithium-alloyable metal, transition metal oxide, non-transition metal oxide, and a carbonaceous material, but the anode active material is not limited thereto.

For example, the lithium-alloyable metal may include (or be) Si, Sn, Al, Ge, Pb, Bi, Sb Si—Y alloy (where Y is alkali metal, alkali earth metal, a Group 13 element, a Group 14 element, transition metal, a rare earth element, or a combination thereof, and is not Si), or Sn—Y alloy (where Y is alkali metal, alkali earth metal, a Group 13 element, a Group 14 element, transition metal, rare earth element, or a combination thereof, and is not Sn). The element Y may include (or be) Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may include (or be) titanium oxide, a vanadium oxide, or a lithium vanadium oxide.

For example, the transition metal oxide may include (or be) $SnO_2$, $SiO_x$ ($0 < x < 2$), or the like.

The carbonaceous material may include (or be) a crystalline carbon, an amorphous carbon, or a mixture thereof. The crystalline carbon may include (or be) natural or artificial graphite that is non-shaped, tabular, flake, spherical, or fibrous, and the amorphous carbon may include (or be) soft carbon (cold calcined carbon) or hard carbon, meso-phase pitch carbide, calcined corks, or the like.

In more detail, the negative active material may include (or be) at least one selected from graphite, Si, Sn, Pb, Ge, Al, $SiOx$ ($0 < x \leq 2$), $SnOy$ ($0 < y \leq 2$), $Li_4Ti_5O_{12}$, $TiO_2$, $LiTiO_3$, and $Li_2Ti_3O_7$.

The conductive agent, the binder, and the solvent included in the anode active material composition may be the same (or substantially the same) as those used (utilized) in the cathode active material composition. Also, a plasticizer may be further included in the cathode active material composition and/or the anode active material composition to form pores in an electrode plate (e.g., the anode or the cathode).

Amounts of the anode active material, the conductive agent, the binder, and the solvent may be at the same (or substantially the same) levels as used (utilized) in the art for lithium batteries. According to the purpose and structure of a lithium battery, one or more of the conductive agent, the binder, and the solvent may not be used (e.g., may be omitted).

Then, a separator which is to be between (or inserted between) the cathode and the anode is prepared. The separator may include (or be) any one of various suitable materials that are available in the art for a lithium battery. A material for forming the separator may include (or be) a material that has low resistance to ion migration of an electrolyte and has excellent electrolytic solution retaining capability. For example, the separator forming material may be selected from glass fiber, polyester, Teflon, polyethylene, polypropylene, polytetrafluoroethylene (PTFE), and a combination thereof, each of which may be in a non-woven fabric or woven fabric form, but the separator is not limited thereto. In more detail, a separator for a lithium ion battery may include (or be) a rollable separator including (or formed of) polyethylene or polypropylene, and a separator for a lithium ion polymer battery may include (or be) a separator having excellent organic electrolyte-retaining capabilities. For example, the foregoing separators may be prepared by using (utilizing) the following method.

A separator composition is prepared by mixing a polymer resin, a filler, and a solvent. The separator composition may be directly coated or dried on an electrode to complete the formation of the separator. In other embodiments, the separator composition may be cast on a separate support and then a film separated from the support is laminated on an electrode, thereby completing the formation of the separator.

A polymer resin used (utilized) in preparing the separator may not be particularly limited, and all the materials used (utilized) for a binder of an electrode plate may be used (utilized). For example, a vinylidene fluoride/hexafluoropropylene copolymer, polyvinylidenefluoride (PVDF), polyacrylonitrile, polymethylmethacrylate, or a mixture thereof may be used (utilized).

Then, an electrolyte may be prepared.

For example, the electrolyte may include (or be) an organic electrolytic solution. According to an embodiment of the present invention, the electrolyte may be a solid. For example, boron oxide, lithiumoxynitrite, or the like may be used (utilized), but the electrolyte is not limited thereto, and the electrolyte may include (or be) any one of various suitable materials that are available as a solid electrolyte in the art. The solid electrolyte may be formed on an anode by, for example, sputtering.

For example, an organic electrolytic solution may be prepared. The organic electrolytic solution may be prepared by dissolving a lithium salt in an organic solvent.

The organic solvent may include (or be) any one of various suitable materials that are available as an organic solvent in the art. For example, the organic solvent may be selected from propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofuran, 2-methyltetrahydrofuran, γ-butyrolactone, dioxorane, 4-methyldioxorane, N,N-dimethylformamide, dimethylacetamide, dimethylsulfoxide, dioxane, 1,2-dimethoxyethane, sulforane, dichloroethane, chlorobenzene, nitrobenzene, diethyleneglycol, dimethylether, and a combination thereof, but the organic solvent is not limited thereto.

The lithium salt may include (or be) any one of various suitable lithium salts available in the art. For example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI or a mixture thereof may be used (utilized), but the lithium salt is not limited thereto.

Figure 7:
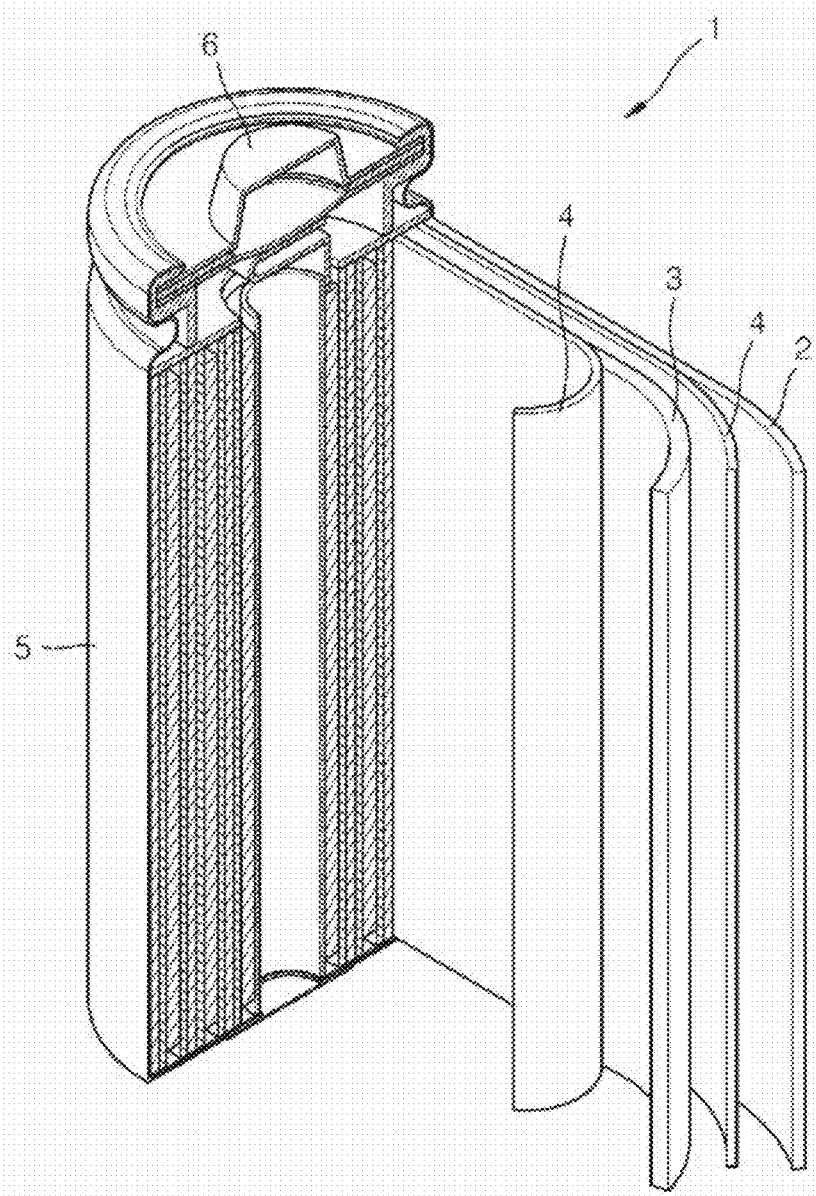
FIG. 7 is a schematic view of a lithium battery according to an embodiment of the present invention.

Referring to FIG. 7, a lithium battery 1 includes a cathode 3, an anode 2, and a separator 4. The cathode 3, the anode 2, and the separator 4 are wound or folded to be placed in a battery case 5. Subsequently, an organic electrolytic solution is injected into the battery case 5, and the resultant structure is sealed with a cap assembly 6, thereby completing the manufacturing of the lithium battery 1. The battery case 5 may be a circular case, a rectangular case, or a thin-film type (or kind) case, but the battery case is not limited thereto. For example, the lithium battery 1 may be a thin film-type (or kind) battery. The lithium battery 1 may be a lithium ion battery.

A separator may be interposed between the cathode and the anode to form a battery assembly. In some embodiments, the battery assemblies are stacked in a bi-cell structure, and the resultant structure is immersed in an organic electrolytic solution, and the obtained result is housed in a pouch, followed by being sealed to complete the manufacturing of a lithium ion polymer battery.

Also, a plurality of the battery assemblies may be stacked to form a battery pack, and the battery pack may be used (utilized) in various devices that require high capacitance and high power output. For example, the battery pack may be used (utilized) in a notebook, a smart phone, an electric vehicle, or the like, but the present disclosure is not limited thereto.

For example, due to its high-temperature charging and discharging characteristics and high-temperature stability, the lithium battery may be suitable for use in an electric vehicle (EV). For example, the lithium battery is suitable for use in a hybrid car, such as a plug-in hybrid electric vehicle (PHEV).

A method of preparing an electrode active material according to an embodiment of the present invention includes mixing a core including a cathode active material and a solid ion conductor; and forming a coating layer including the solid ion conductor on the core by using (utilizing) a dry method. The solid ion conductor may have a single-modal particle diameter distribution having substantially one peak in a particle-diameter distribution diagram. The solid ion conductor may have a bimodal particle diameter distribution having substantially two peaks in a particle-diameter distribution diagram. For example, the bimodal particle-diameter distribution may include greater-diameter particles and smaller-diameter particles.

The drying method includes applying mechanical energy to a mixture of the core including the cathode active material and the solid ion conductor, without use of a solvent, to form a coating layer.

The dry method may include (or be), for example, a) a method of contacting a coating material, for example, powder of the solid ion conductor, with a surface of a core by using (utilizing) a low speed ball mill so that the solid ion conductor particles used (utilized) as the coating material are attached to the surface of the core particle and at the same time (or concurrently) the coating material particles aggregate to form a coating layer, b) a method of forcing coating material particles to contact a surface of a core particle by rotation of a grinding media or a rotator disposed in an apparatus, and simultaneously (or concurrently) binding the coating material particles mechanically on the core particle by stresses or binding the particles by softening or fusing a coating layer of the coating material particles on the core particle by a heat produced by the stresses, or c) a method of fusing a portion of the coating layer or the entire coating layer with the core by performing a heat treatment on the core covered by the coating layer formed according to the method a) and/or b) and then cooling. The dry method, however, is not limited thereto, and any suitable dry process available in the art may be used (utilized) herein.

For example, the dry method may include (or be) any one method selected from the group consisting of a ball mill method, a low-speed ball mill method, a high-speed ball mill method, a hybridization method, and a mechanofusion method, but the dry method is not limited thereto. For example, the dry method may include (or be) a mechanofusion method. According to the mechanofusion method, a mixture is provided into a vessel that is rotating and then, due to a centrifuging force, the mixture is fixed on an inner wall of the vessel and then, the mixture is compressed in a gap between the inner wall of the vessel and an arm head which approaches the inner wall of the vessel while being spaced from the inner wall in the gap. The mechanofusion method corresponds to the above-described method b).

The dry method may further include heat treating the resultant structure including the coating layer after the coating layer is formed. The heat treatment may contribute to an increase in rigidity of the coating layer. Conditions for the heat treatment may not be limited as long as the coating layer is completely or incompletely molten. For example, the heat treatment may include (or be) a calcination process.

In the method, an amount of the solid ion conductor may be 10 wt % or less based on the total weight of the core and the solid ion conductor. For example, an amount of the solid on conductor may be 5 wt % or less based on the total weight of the core and the solid ion conductor. For example, an amount of the solid ion conductor may be greater than 0 and equal to or smaller than (or less than) 10 wt %. For example, an amount of the solid ion conductor may be greater than 0 and equal to or smaller than (or less than) 5 wt %.

In the method, the solid ion conductor (e.g., the lithium ion conductor particles) having a bimodal particle diameter distribution may be prepared by mixing greater-diameter lithium ion conductor particles and smaller-diameter lithium ion conductor particles.

The calcination of the mixture (e.g., the mixture of the core and the solid ion conductor) may be performed at a temperature of about 500 to about 1500° C. For example, the calcination of the mixture may be performed at a temperature of about 600 nm to about 800° C.

In the method, the calcination of the mixture may be performed for a time period of about 2 hours to about 10 hours. For example, the calcination may be performed for about 3 hours to about 5 hours. For example, the calcination may be performed for about 3 hours to about 5 hours.

The calcination may be performed in an atmosphere of oxygen, air, and nitrogen, but the calcination is not limited thereto. For example, the calcination may be performed in an air atmosphere.

Embodiments of the present invention are described in more detail with reference to Examples below. However, the Examples are presented herein for illustrative purposes only, and do not limit the scope of the present invention.

Preparation of Lithium Ion Conductor

PREPARATION EXAMPLE 1

Preparation of Bimodal Lithium Ion Conductor $Li_2CO_3$, $TiO_2$, SnO, and $(NH_4)_2HPO_4$ were mixed at an equivalence ratio (e.g., in stoichiometric amounts), and then calcined at high temperature. To decompose ammonium hydrophosphate, the calcination was performed at a temperature of 400° C. for 5 hours and then at a temperature of 1200° C. for 48 hours. The calcination product was pulverized by using (utilizing) a paint shaker to obtain particles having a bimodal particle-diameter distribution.

The greater-diameter particles of the obtained bimodal solid ion conductor powder had an average particle diameter (D50) of 10 μm, and the smaller-diameter particles thereof had an average particle diameter (D50) of 0.5 μm.

Figure 4:
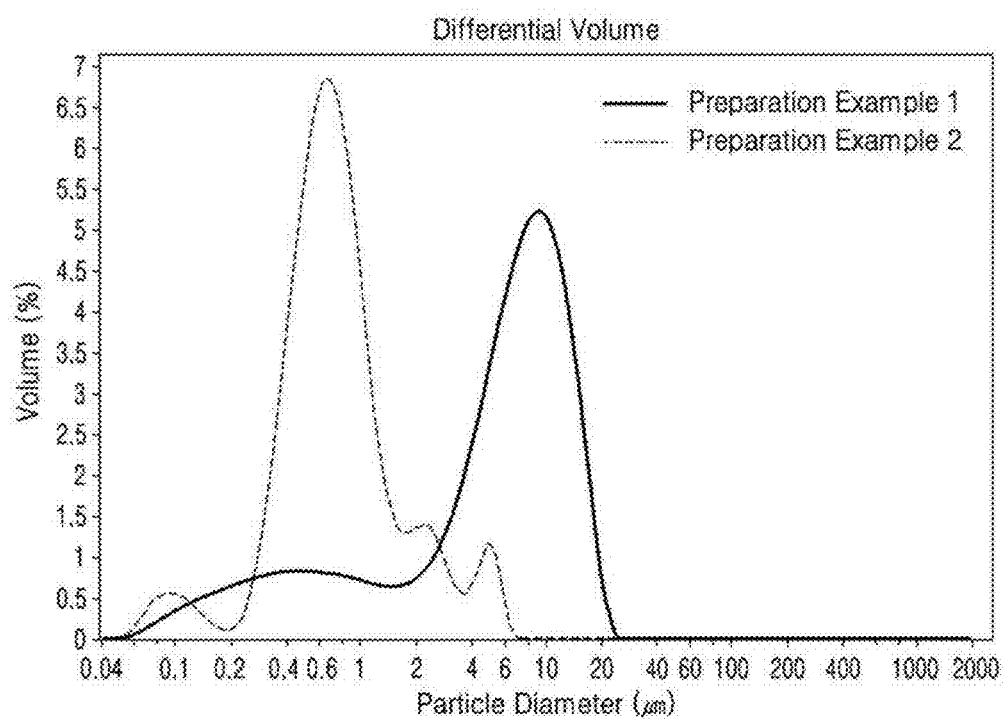
FIG. 4 is a graph showing particle size analysis (PSA) results of solid ion conductors prepared according to Preparation Example 1 and Preparation Example 2.

FIG. 4 shows particle size analysis (PSA) data of bimodal LTSP ($LiTi_{1.2}Sn_{0.8}(PO_4)_3$) prepared as in Preparation Example 1.

PREPARATION EXAMPLE 2

Preparation of Single-modal Lithium Ion Conductor $Li_2CO_3$, $TiO_2$, SnO, and $(NH_4)_2HPO_4$ were mixed at an equivalence ratio (e.g., in stoichiometric amounts), and then calcined at high temperature. To decompose ammonium hydrophosphate, the calcination was performed at a temperature of 400° C. for 5 hours and then at a temperature of 1200° C. for 48 hours. The calcination product was pulverized by using (utilizing) a painter shaker, and then, pulverized by using (utilizing) a beads mill (or a ball mill).

An average particle diameter (D50) of the obtained single-modal solid ion conductor powder was 1 μm.

FIG. 4 shows particle size analysis (PSA) data of single-modal LTSP ($LiTi_{1.2}Sn_{0.8}(PO_4)_3$) prepared as in Preparation Example 2.

Preparation of Composite Cathode Active Material

EXAMPLE 1

Solid Ion Conductor 0.1 wt % Coating 100 parts by weight of $Li[Ni_{0.65}Co_{0.2}Mn_{0.15}]O_2$ having an average particle diameter (D50) of 6 μm, which was self-produced, was mixed with 0.1 parts by weight of a bimodal solid ion conductor powder prepared as in Preparation Example 1, and then, the mixture was fed into a dry-type (or kind) surface treatment device (Hosokawa Micron Corporation, Japan, Mechanofusion device, Nobilta-130), and then treated at a rotational rate of 6000 rpm for 5 minutes, and then heat treated at a temperature of 700° C. in an air atmosphere for 5 hours to complete the preparation of a composite cathode active material in which a coating layer including smaller-diameter $LiTi_{1.2}Sn_{0.8}(PO_4)_3$ was disposed on the $Li[Ni_{0.65}Co_{0.2}Mn_{0.15}]O_2$ core, and the coating layer including greater-diameter $LiTi_{1.2}Sn_{0.8}(PO_4)_3$ was present between $Li[Ni_{0.65}Co_{0.2}Mn_{0.15}]O_2$ cores.

Figure 2:
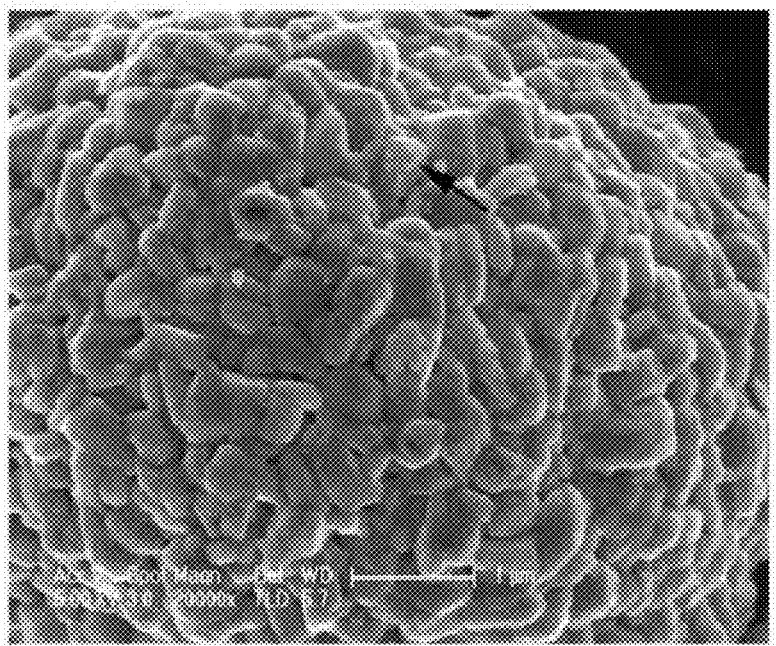
FIGS. 2 to 3 are SEM images of composite cathode active materials prepared according to Example 1.
Figure 3:
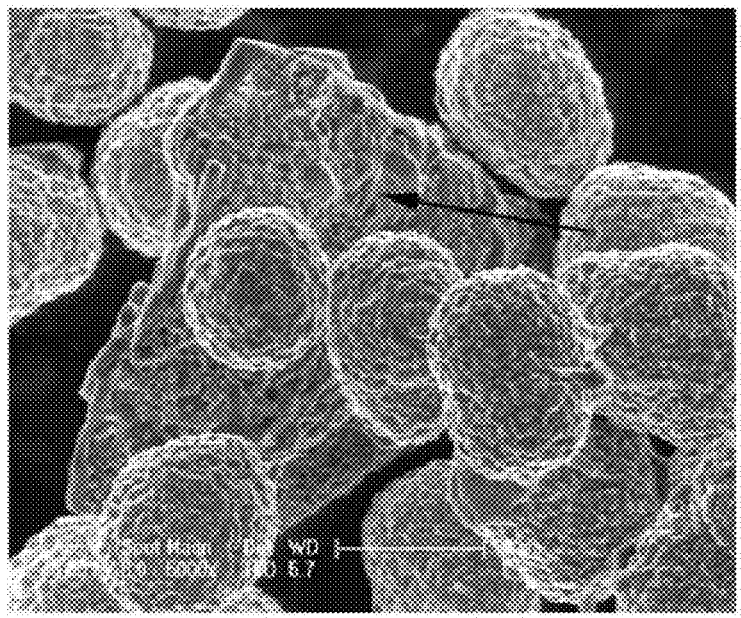

As shown in FIG. 2, a coating layer including the smaller-diameter particles the a solid ion conductor is on (or formed on) the core, and as shown in FIG. 3, the greater-diameter particles of the solid ion conductor are disposed between a plurality of cores.

EXAMPLE 2

Coating with 1 wt % Solid Ion Conductor

A composite cathode active material was prepared as in Example 1, except that 100 parts by weight of $Li[Ni_{0.65}Co_{0.2}Mn_{0.15}]O_2$ was mixed with 1 part by weight of a bimodal solid ion conductor powder prepared as in Preparation Example 1.

EXAMPLE 3

Coating with 5 wt % Solid Ion Conductor

A composite cathode active material was prepared as in Example 1, except that 100 parts by weight of $Li[Ni_{0.65}Co_{0.2}Mn_{0.15}]O_2$ was mixed with 5 parts by weight of a bimodal solid ion conductor powder prepared as in Preparation Example 1.

EXAMPLE 4

Coating with 5.5 wt % Solid Ion Conductor

A composite cathode active material was prepared as in Example 1, except that 100 parts by weight of $Li[Ni_{0.65}Co_{0.2}Mn_{0.15}]O_2$ was mixed with 5.5 parts by weight of a bimodal solid ion conductor powder prepared as in Preparation Example 1.

EXAMPLE 5

Coating with 1 wt % Single-modal Solid Ion Conductor

A composite cathode active material was prepared as in Example 1, except that 100 parts by weight of $Li[Ni_{0.65}Co_{0.2}Mn_{0.15}]O_2$ was mixed with 1 part by weight of a single-modal solid ion conductor powder prepared as in Preparation Example 2.

COMPARATIVE EXAMPLE 1

Including a Core without the Coating Layer $Li[Ni_{0.65}Co_{0.2}Mn_{0.15}]O_2$ having an average particle diameter (D50) of 6 μm as in Example 1 was heat treated at a temperature of 700° C. in air atmosphere for 5 hours, without the formation of the coating layer, and the resultant from the heat treatment was used (utilized) as a cathode active material.

COMPARATIVE EXAMPLE 2

Simple Mixing with 0.1 wt % of Solid Ion Conductor $Li[Ni_{0.65}Co_{0.2}Mn_{0.15}]O_2$ having an average particle diameter (D50) of 6 μm as in Example 1 was simply mixed with 0.1 parts by weight of a bimodal solid ion conductor powder manufactured as in Preparation Example 1, and then, heat treated at a temperature of 700° C. in air atmosphere for 5 hours, without the formation of the coating layer, and the resultant from the heat treatment was used (utilized) as a cathode active material.

Preparation of Cathode

EXAMPLE 6

A composite cathode active material prepared as in Example 1, a carbon conductive agent (Ketchen Black, EC-600JD), and polyvinylidenefluoride (PVdF) were mixed at a weight ratio of 94:4:4, and the mixture was mixed with N-methylpyrrolidone (NMP) in an agate mortar to prepare a slurry. The slurry was coated on a 15 μm-thick aluminum collector by using (utilizing) a doctor blade to a thickness of about 20 μm, and then, the coating layer was dried at room temperature and then dried under a vacuum condition at a temperature of 120° C. to manufacture a cathode plate including a cathode active material layer.

EXAMPLES 7 to 10

Cathode plates were manufactured as in Example 6, except that composite cathode active materials prepared as in Examples 2 to 5 were used (utilized) in Examples 7 to 10, respectively.

COMPARATIVE EXAMPLES 3 and 4

Cathode plates were manufactured as in Example 6, except that cathode active materials prepared as in Comparative Examples 1 to 2 were used (utilized) in Comparative Examples 3 and 4, respectively.

Manufacturing of Lithium Battery

EXAMPLE 11

A coin cell was prepared by using (utilizing) a cathode plate manufactured as in Example 6, a counter electrode including (or formed of) lithium metal, a PTFE separator, and an electrolyte including 1.3M $LiPF_6$, 1 wt % succinonitrile (SN), 5 wt % fluoroethylenecarbonate (FEC), and 0.2 wt % $LiBF_4$ dissolved in ethylenecarbonate (EC)/ethylmethylcarbonate (EMC)/diethylcarbonate (DEC) (at a volumetric ratio of 3:3:4).

EXAMPLES 12 to 15

Coin cells were manufactured as in Example 11, except that cathode plates manufactured as in Examples 7 to 10 were used (utilized) in Examples 12 to 15, respectively.

COMPARATIVE EXAMPLES 5 and 6

Coin cells were manufactured as in Example 11, except that cathode plates manufactured as in Comparative Examples 3 and 4 were used (utilized) in Comparative Examples 5 and 6, respectively.

EVALUATION EXAMPLE 1

High-temperature Stability Test at Temperature of 60° C.

In the $1^{st}$ cycle, coin cells manufactured as in Examples 11 to 15 and Comparative Examples 5 and 6 were charged with a constant current at a rate of 0.1C until the voltage reached 4.3 V, and then, while the voltage was maintained at 4.3 V, the coin cells were charged at a constant voltage until the current reached 0.05 C. Then, the coin cells were discharged with a constant current at a rate of 0.1 C until the voltage reached 3.0 V. In the $2^{nd}$ cycle, the coin cells were charged with a constant current at a rate of 0.2 C until the voltage reached 4.3 V, and then, while the voltage was maintained at 4.3 V, the coin cells were charged at a constant voltage until the current reached 0.05 C. Then, the coin cells were discharged with a constant current at a rate of 0.2 C until the voltage reached 3.0 V. In the $3^{rd}$ cycle, the coin cells were charged with a constant current at a rate of 0.5 C until the voltage reached 4.3 V, and then, while the voltage was maintained at 4.3 V, the coin cells were charged at a constant voltage until the current reached 0.05 C. Then, the coin cells were discharged with a constant current at a rate of 0.5 C until the voltage reached 3.0 V. A discharging capacity in the $3^{rd}$ cycle was regarded as a reference capacity.

In the $4^{th}$ cycle, the coin cells were charged at a rate of 0.5 C until the voltage reached 4.3 V, and then, while the voltage was maintained at 4.3 V, a constant voltage was charged until the current reached 0.05 C. Then, the charged cells were preserved in an oven at a temperature of 60° C. for 10, 20 or 30 days, and then, the coin cells were taken out of the oven and discharged at a rate of 0.5 C until the voltage reached 3.0 V. A discharge capacity of the $4^{th}$ cycle was regarded as a residual capacity. In the $5^{th}$ cycle, the coin cells were charged with a constant current at a rate of 0.5 C until the voltage reached 4.3 V, and then, while the voltage was maintained at 4.3 V, the coin cells were charged at a constant voltage until the current reached 0.05 C. Then, the coin cells were discharged with a constant current at a rate of 0.2 C until the voltage reached 3.0 V. A discharging capacity of the $5^{th}$ cycle was regarded as a recovery capacity. Some of the above-described charging and discharging results are shown in Table 1. The capacity recovery ratio after the preservation at high-temperature is defined by Equation 1:

Recovery ratio after the preservation at high-temperature [%]=[discharging capacity after preservation at high temperature in $5^{th}$ cycle (recovery capacity)/reference capacity]×100    Equation 1

(the reference capacity is the discharging capacity measured in the $3^{rd}$ cycle)

EVALUATION EXAMPLE 2

Interfacial Resistance Increase Ratio Test and Total Resistance Increase Ratio Test An interfacial resistance increase ratio and a total resistance increase ratio of coin cells manufactured as in Examples 11 to 15 and Comparative Examples 5 and 6 were measured, and results thereof are shown in Table 1 below.

The interfacial resistance and the total resistance were measured by impedance analysis, and the interfacial resistance increase ratio and the total resistance increase ratio are values obtained based on the assumption that the interfacial resistance and the total resistance of the coin cells before the preservation at high temperature were each 100%.

TABLE 1

|  | Comparative Example 5 | Example 12 |
|---|---|---|
| Capacity recovery ratio after preservation at a temperature of 60° C. for 10 days [%] | 93 | 92 |
| Capacity recovery ratio after preservation at a temperature of 60° C. for 20 days [%] | 89 | 90 |
| Capacity recovery ratio after preservation at a temperature of 60° C. for 30 days [%] | 84 | 87 |
| Interfacial resistance increase ratio after preservation at a temperature of 60° C. for 10 days [%] | 129 | 121 |
| Interfacial resistance increase ratio after preservation at a temperature of 60° C. for 20 days [%] | 152 | 131 |
| Interfacial resistance increase ratio after preservation at a temperature of 60° C. for 30 days [%] | 188 | 151 |
| Total resistance increase ratio after preservation at a temperature of 60° C. for 10 days [%] | 127 | 121 |

TABLE 1-continued

|  | Comparative Example 5 | Example 12 |
|---|---|---|
| Total resistance increase ratio after preservation at a temperature of 60° C. for 20 days [%] | 149 | 131 |
| Total resistance increase ratio after preservation at a temperature of 60° C. for 30 days [%] | 180 | 148 |

As shown in Table 1, after the high-temperature preservation, the capacity recovery ratio of the lithium battery of Example 12 was substantially better than that of the lithium battery of Comparative Example 5. That is, high-temperature stability of a lithium battery according to embodiments of the present invention was substantially improved.

As shown in Table 1, after the high-temperature preservation, the interfacial resistance increase ratio and total resistance increase ratio of the lithium battery of Example 12 were substantially decreased as compared to those of the lithium battery of Comparative Example 5.

EVALUATION EXAMPLE 3

Charging and Discharging Test at Room Temperature

In the $1^{st}$ cycle, at room temperature (25° C.), coin cells manufactured as in Examples 11 to 15 and Comparative Examples 5 and 6 were charged with a constant current at a rate of 0.1 C until the voltage reached 4.3 V, and then, while the voltage was maintained at 4.3 V, the coin cells were charged at a constant voltage until the current reached 0.05 C. Then, the coin cells were discharged with a constant current at a rate of 0.1 C until the voltage reached 3.0 V. In the $2^{nd}$ cycle, the coin cells were charged with a constant current at a rate of 0.2 C until the voltage reached 4.3 V, and then, while the voltage was maintained at 4.3 V, the coin cells were charged at a constant voltage until the current reached 0.05 C. Then, the coin cells were discharged with a constant current at a rate of 0.2 C until the voltage reached 3.0 V. In the $3^{rd}$ cycle, the coin cells were charged with a constant current at a rate of 0.33 C until the voltage reached 4.3 V, and then, while the voltage was maintained at 4.3 V, the coin cells were charged at a constant voltage until the current reached 0.05 C. Then, the coin cells were discharged with a constant current at a rate of 0.33 C until the voltage reached 3.0 V. In the $4^{th}$ cycle, the coin cells were charged with a constant current at a rate of 0.33 C until the voltage reached 4.3 V, and then, while the voltage was maintained at 4.3 V, the coin cells were charged at a constant voltage until the current reached 0.05 C. Then, the coin cells were discharged with a constant current at a rate of 0.5 C until the voltage reached 3.0 V. In the $5^{th}$ cycle, the coin cells were charged at a rate of 0.33 C until the voltage reached 4.3 V, and then, while the voltage was maintained at 4.3 V, the coin cells were charged at a constant voltage until the current reached 0.05 C. Then, the coin cells were discharged at a rate of 1 C. Initial columbic efficiency is defined by Equation 3 below (which references the $1^{st}$ room temperature cycle), and high-rate characteristics (1C/0.1C capacity retention ratio) are defined by Equation 4 below (which references the $1^{st}$ and $5^{th}$ room temperature cycles):

Initial columbic efficiency [%]=[discharging capacity in $1^{st}$ cycle/charging capacity in $1^{st}$ cycle]×100    Equation 3

1C/0.1C capacity retention ratio [%]=[discharging capacity in 5$^{th}$ cycle (1C)/1$^{st}$ discharging capacity in 1st cycle (0.1C)]×100   Equation 4

TABLE 2

|  | Initial columbic efficiency [%] | 1 C/0.1 C capacity retention ratio [%] |
|---|---|---|
| Comparative Example 5 | 94.3 | 91.4 |
| Comparative Example 6 | 93.1 | 88.0 |
| Example 11 | 95.1 | 90.9 |
| Example 12 | 93.3 | 89.6 |

As shown in Table 2, the initial columbic efficiency and high-rate characteristics of the lithium batteries of Examples 11 and 12 were similar to those of the lithium battery of Comparative Example 5, and were higher than those of the lithium battery of Comparative Example 6.

EVALUATION EXAMPLE 4

High-temperature Lifespan Characteristics

Coin cells manufactured as in Examples 11 to 15 and Comparative Example 5 were charged and discharged 260 times with a constant current at a 1 C rate in a voltage range of 3.0 to 4.3 V with respect to lithium metal at a temperature of 45° C. Some of the charging and discharging test results are shown in FIGS. 5 and 6.

Figure 5:
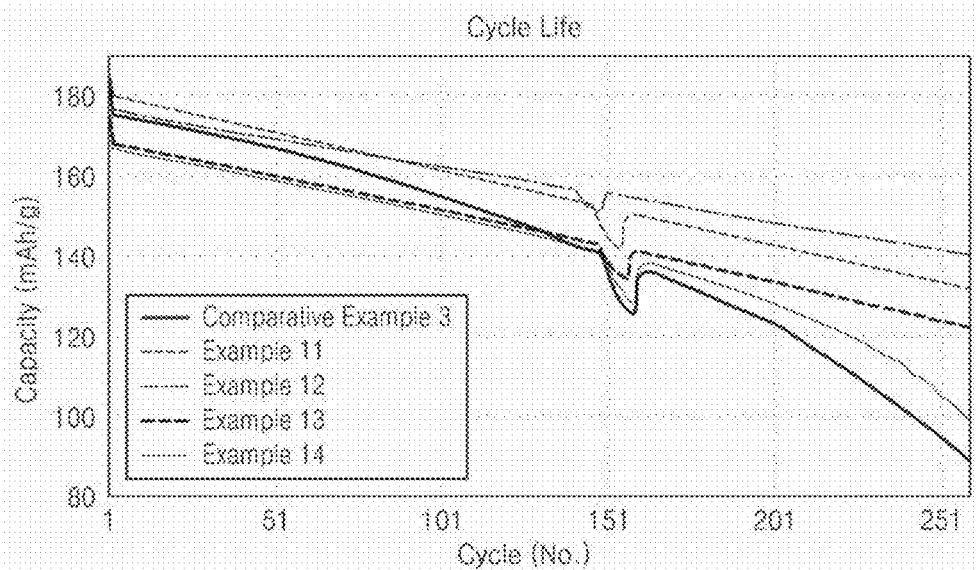
FIG. 5 is a graph showing lifespan characteristics test results of lithium batteries manufactured according to Examples 11 to 14 and Comparative Example 5.

As shown in FIG. 5, lifespan characteristics of the coin cells of Examples 11 to 14 were improved as compared to those of the coin cell of Comparative Example 5.

Figure 6:
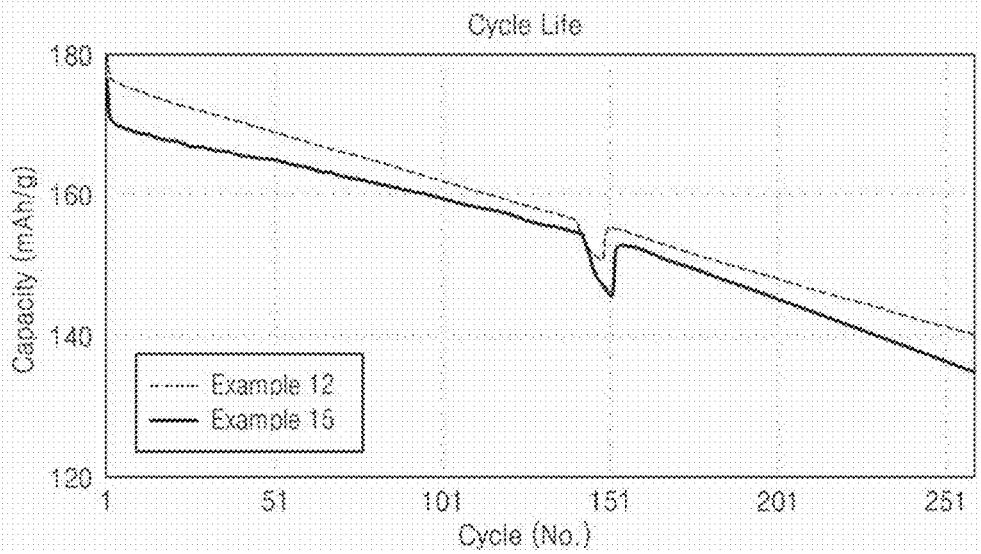
FIG. 6 is a graph showing lifespan characteristics test results of lithium batteries prepared according to Examples 12 and 15.

As shown in FIG. 6, in the case that the same (or substantially the same) amount of solid ion conductor was used (utilized) for coating, the coin cell of Example 12 including a bimodal solid ion conductor coated had improved lifespan characteristics as compared to the coin cell of Example 15, which included a single-modal solid ion conductor.

Due to the use of a composite cathode active material including a solid ion conductor having a bimodal particle diameter distribution (e.g., a bimodal solid ion conductor), lifespan characteristics and high-temperature stability of a lithium battery are improved.

It should be understood that the example embodiments described herein should be considered in a descriptive sense only and not for purposes of limitation. Descriptions of features or aspects within each embodiment should typically be considered as being available for other similar features or aspects in other embodiments.

While one or more embodiments of the present invention have been described with reference to the figures, it will be understood by those of ordinary skill in the art that various changes in form and details may be made herein without departing from the spirit and scope of the present invention as defined by the following claims, and equivalents thereof.

What is claimed is:

1. A composite cathode active material comprising:
    a material capable of intercalating or deintercalating lithium; and
    a solid ion conductor, wherein the solid ion conductor comprises particles having two or more size groups, each size group has different average particle diameters,
    wherein the solid ion conductor comprises a NASICON-type lithium ion conductor represented by Formula 2 below:

$Li_{1+z}Ma_xMb_{2-x}(PO_4)_3$   Formula 2 wherein Ma and Mb are each independently at least one selected from the group consisting of Zn, Cd, Ni, Mn, Co, Fe, Sc, Ti, V, Cr, Al, In, Ga, Y, Lu, Zr, Hf, Sn, Si, Ge, V, Nb, Ta, Sb, and As, and $0 \leq x \leq 0.8$, and $0 \leq z \leq 0.8$.

2. The composite cathode active material of claim 1, wherein the solid ion conductor has a bimodal particle diameter distribution comprising greater-diameter particles and smaller-diameter particles.

3. The composite cathode active material of claim 1, wherein:
    a core comprises the material capable of intercalating or deintercalating lithium, and
    a coating layer is on at least a portion of the core, and the coating layer comprises the solid ion conductor.

4. The composite cathode active material of claim 3, wherein the coating layer connects a plurality of cores.

5. The composite cathode active material of claim 3, wherein the solid ion conductor of the coating layer comprises smaller-diameter particles.

6. The composite cathode active material of claim 4, wherein the solid ion conductor of the coating layer connecting the cores comprises greater-diameter particles.

7. The composite cathode active material of claim 5, wherein an average particle diameter (D50) of the smaller-diameter particles is 10 μm or less.

8. The composite cathode active material of claim 6, wherein an average particle diameter (D50) of the greater-diameter particles is greater than 10 μm and equal to or less than 100 μm.

9. The composite cathode active material of claim 1, wherein an amount of the solid ion conductor is 10 wt % or less based on a total weight of the composite cathode active material.

10. The composite cathode active material of claim 1, wherein an amount of the solid ion conductor is 6 wt % or less based on a total weight of the composite cathode active material.

11. The composite cathode active material of claim 1, wherein the solid ion conductor further comprises at least one selected from the group consisting of a NASICON-type lithium ion conductor, a thio-NASICON-type lithium ion conductor, a garnet-type lithium ion conductor, a perovskite-type lithium ion conductor, and a lithium phosphorous oxynitride (LiPON)-type lithium ion conductor.

12. The composite cathode active material of claim 1, wherein the solid ion conductor comprises at least one selected from the group consisting of $LiTi_{1.2}Sn_{0.8}(PO_4)_3$, $Li_{1.5}SnTi_{0.5}Al_{0.5}(PO_4)_3$, $Li_{1.3}Ti_{1.7}Al_{0.5}(PO_4)_3$, $LiAlO_2$, $Li_3PO_4$, $Li_4SiO_4$, $Li_{1.3}La_{0.3}Ti_{1.7}(PO_4)_3$, and $La_{0.5}Li_{0.5}TiO_3$.

13. The composite cathode active material of claim 3, wherein the material capable of intercalating or deintercalating lihtium comprises a compound represented by one of Formula 3 to 7 below:

$Li_xCo_{1-y}M_yO_{2-a}X_a$   Formula 3

$Li_xNi_yCo_zM_{1-y-z}O_{2-a}X_a$   Formula 4

$Li_xMn_{2-r}M_rO_{4-a}X_a$   Formula 5

$Li_xCo_{2-r}M_rO_{4-a}X_a$   Formula 6

$Li_xMe_yM_zPO_4-aXa$   Formula 7 wherein: $0.90 \leq x \leq 1.1$, $0 \leq y < 1$, $0 \leq z < 1$, $1-y-z > 0$, and $0 \leq a \leq 2$, and $0 \leq r < 1$, Me comprises at least one metal selected from the group consisting of Ti, V, Cr, Mn, Fe, Co, Ni, Cu, Al, Mg, Zr, and B, M comprises at least one element selected from the group consisting of Mg, Ca, Sr, Ba, Ti, Zr, Nb, Mo, W, Zn, Al, Si, Ni, Mn, Cr, Fe, Mg, Sr, V, and a rare-earth element, and X comprises at least one element selected from the group consisting of O, F, S, and P.

14. A cathode comprising the composite cathode active material of claim 1.

15. A lithium battery comprising the cathode of claim 14.

* * * * *